(12) United States Patent
Hegernier et al.

(10) Patent No.: US 6,230,679 B1
(45) Date of Patent: May 15, 2001

(54) VALVE STEM SEAL WITH PADS AND TANGS

(75) Inventors: Timothy A. Hegernier; Mark A. Stamback, both of Avilla; Robert W. Lehmann, Fort Wayne, all of IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/393,392

(22) Filed: Sep. 10, 1999

(51) Int. Cl.$^7$ .......................................... F01L 3/08
(52) U.S. Cl. ........................................ 123/190.17
(58) Field of Search ................... 123/188.13, 188.9, 123/188.6, 190.17, 188.11

(56) References Cited

U.S. PATENT DOCUMENTS

| | | | |
|---|---|---|---|
| 3,771,800 | * 11/1973 | Wilson et al. | 123/188.6 |
| 4,502,696 | * 3/1985 | Kammeraad | 123/188.6 |
| 4,509,473 | 4/1985 | Hamparian | 123/188 SC |
| 4,773,363 | 9/1988 | Stritzke | 123/188 P |
| 4,811,704 | 3/1989 | Boehmer et al. | 123/188 P |
| 4,909,202 | 3/1990 | Binford et al. | 123/188 P |
| 4,947,811 | 8/1990 | Binford | 123/188 P |
| 5,237,971 | 8/1993 | Worsley | 123/188.6 |

* cited by examiner

Primary Examiner—Noah P. Kamen
Assistant Examiner—Hyder Ali
(74) Attorney, Agent, or Firm—Rader, Fishman & Grauer PLLC

(57) ABSTRACT

A valve stem seal assembly includes a resilient seal member mounted to a shell body having a downwardly extending skirt. At least one alignment pad or tang is provided in the skirt of the shell body for improved gripping of an outside diameter of a valve guide. In one embodiment, the alignment pad includes an inwardly projecting ramp portion connected to a generally longitudinally extending land portion and terminates in an inwardly projecting tang adjacent the land portion. In another embodiment, a valve stem seal assembly includes at least one tang having a generally arcuate end portion with a pair of spaced apart upwardly extending shoulders for gripping a valve guide.

8 Claims, 2 Drawing Sheets

VALVE STEM SEAL WITH PADS AND TANGS

FIELD OF THE INVENTION

The present invention relates to valve stem seals utilized in intake and exhaust manifolds of internal combustion engines.

BACKGROUND OF THE INVENTION

Valve stem seals having resilient seal bodies supported within rigid cylindrical casings are available in many designs and configurations. Most designs address the efficiency of the actual sealing lip portions of the seals which determine a controlled flow of oil between the seal lip and the valve stem.

Generally, the rigid cylindrical casing is supported on a valve stem guide with the inside diameter of the casing frictionally engaging the outside diameter of the guide. Previous designs have utilized tangs on the casing to grip the exterior surface of the guide to resist removal of the valve stem seal from the valve guide. However, the tangs of the prior art do not accommodate wide tolerance variations that are typically encountered with manufacturing valve stem guides. Thus, the tangs of the prior art require more precise valve stem guides to ensure that the tangs will adequately grab the outer diameter of the guide and resist pulling off of the seal. In addition, the tangs in cylindrical casings of the previous designs tend to have engagement along an entire edge of the tang that creates difficulties for aligning the valve stem seal relative to the valve guide and negatively impacts the resistance to removal.

SUMMARY OF THE INVENTION

The present invention is directed to a valve stem seal assembly having a resilient seal member with an outer periphery and an inner sealing surface and a generally cylindrical shell body having a longitudinal central axis and an end wall connected to a downwardly extending skirt. A first aperture is provided in the end wall for accommodating the resilient seal member and at least one alignment pad is provided in the skirt of the shell body wherein the alignment pad includes an inwardly projecting ramp portion connected to a generally longitudinally extending land portion and further including an inwardly projecting tang adjacent the land portion. Optionally, but preferably, the skirt is perforated at a predetermined location to form the at least one alignment tab. Also, the alignment tab terminates with the inwardly projecting tang for helping prevent unwanted removal of the valve stem seal assembly from a valve guide. Moreover, the at least one alignment tab can be a plurality of alignment tabs. Preferably, there are three alignment tabs circumferentially spaced apart around the skirt to provide increased contact area for alignment with valve guides having a greater variation in their outer diameter yet still provide improved positive retention of the valve stem seal assembly on the valve guide without substantially increasing the required installation force.

The present invention is also directed to a valve stem seal assembly having a resilient seal member with an outer periphery and an inner sealing surface and further including a first circumferential groove provided in the outer periphery. A generally cylindrical shell body having a longitudinal central axis and an end wall connected to a downwardly extending skirt is also provided. A first aperture provided in the end wall accommodates the first circumferential groove in the resilient seal member. In addition, a plurality of alignment pads are provided in the skirt of the shell body wherein each of the alignment pads includes an inwardly projecting ramp portion connected to a land portion that extends generally parallel to the central axis and further includes an inwardly projecting tang adjacent the land portion for improved positive retention of the valve stem seal assembly on a valve guide without substantially increasing required installation force.

Still further, the present invention is directed to a valve stem seal assembly having a resilient seal member mounted on a generally cylindrical shell body that includes a longitudinal central axis and an end wall connected to a downwardly extending skirt. A first aperture is provided in the end wall for accommodating the resilient seal member and at least one tang is provided in the skirt of the shell body wherein the tang includes a free end having a generally arcuate region that is generally perpendicular to the radius of curvature of the inner cylindrical surface of the skirt. In one embodiment, the arcuate region is located between a pair of spaced apart upwardly extending shoulders for gripping a valve guide.

Accordingly, the present invention provides an improved valve stem seal assembly having alignment pads that accommodate a wide variety of manufacturing tolerances for the outer diameter of a valve stem guide while maintaining positive retention of the valve stem seal assembly to the valve guide without substantially increasing the required installation force.

In addition, the present invention provides an improved valve stem seal assembly having tangs with a pair of upwardly extending shoulders for improved gripping of a valve guide to better resist unwanted removal of a valve stem seal assembly.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
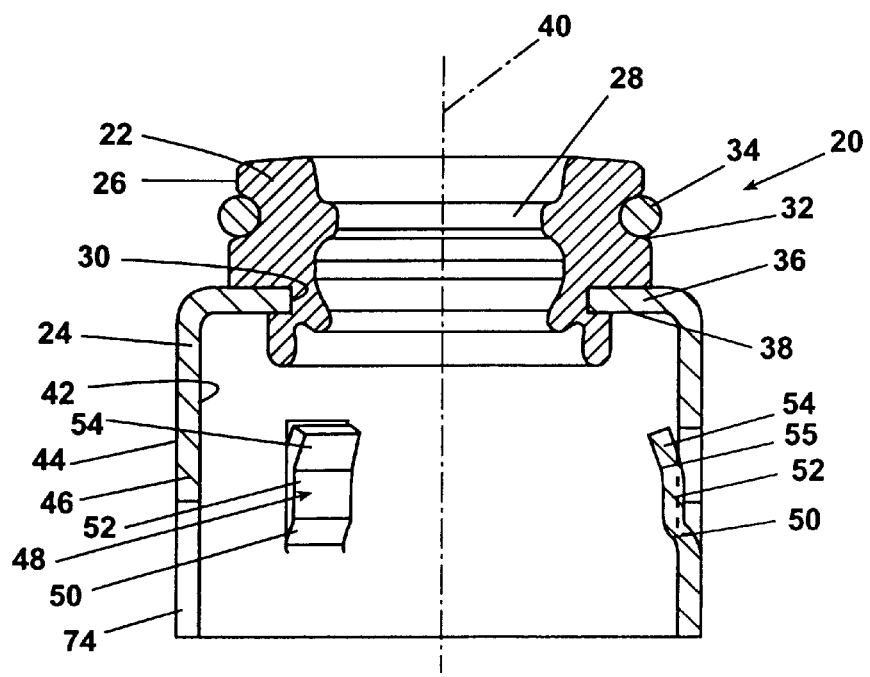
FIG. 1 is a cross-sectional side view of a valve stem seal assembly according to the present invention.

FIG. 1 shows a valve stem seal assembly 20 according to the present invention. Valve stem seal assembly 20 includes a resilient seal member 22 mounted on a shell 24. Seal member 22 has an outer peripheral surface 26 and an inner sealing surface 28. Outer peripheral surface 26 further includes a first circumferentially extending groove 30 and optionally includes a second circumferentially extending groove 32 that receives a garter spring or R-ring 34 that biases inner sealing surface 28 radially inwardly. Shell 24 is preferably generally cylindrical and includes an end wall 36 having an aperture 38 formed therein. Seal member 22 is inserted into aperture 38 in end wall 36 such that the first circumferential groove 30 receives the periphery of end wall 36 adjacent aperture 38. Thus, seal member 22 captures end wall 36 using first circumferential groove 30.

Shell 24 defines a central longitudinal axis 40 and has an inner surface 42 and an outer surface 44. End wall 36 of shell 24 is connected to a downwardly extending skirt 46. At least one alignment pad 48 is provided in the skirt 46 of shell 24 and has three distinct sections. A first section is a ramp or incline 50 that extends at an angle inwardly toward central axis 40. A second section is a land portion 52 that extends generally longitudinally upwardly from ramp section 50. Preferably, land portion 52 extends generally parallel to the central axis. Further, an inwardly projecting tang 54 is connected adjacent the land portion 52 by a generally arcuate transition region 55 that is generally perpendicular to the radius of curvature of the inner surface 42 of skirt 46. Tang 54 improves positive retention of the valve stem seal assembly on a valve guide as described below. Preferably, skirt 46 is perforated to form alignment pad 48 such that alignment pad 48 is integral with skirt 46 but has a cantilever effect that permits alignment pad 48 to resiliently flex relative to skirt 46. Any number of alignment pads 48 can be provided, however, there are preferably three alignment pads 48 spaced circumferentially apart around the inner surface of shell 24 to provide suitable positioning of valve seal assembly 20 on a valve guide and securely grip the valve guide to resist removal.

Figure 2:
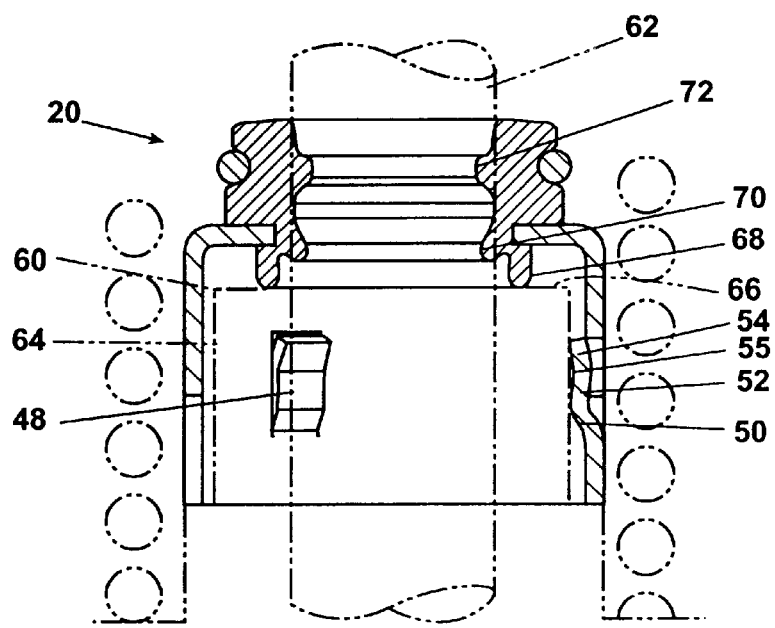
FIG. 2 is a cross-sectional side view of a valve stem seal assembly in an installed position on a valve guide.

FIG. 2 shows valve stem seal assembly 20 installed onto a valve guide 60 and a valve stem 62. Valve guide 60 has an outer diameter surface 64 and a top surface 66. Outer diameter surface 64 has variations in outer diameter dimensions from tolerance variations in manufacturing one valve stem versus another. The valve stem seal assembly 20 of the present invention allows for greater variation in outer diameters between different valve guides and enables manufacturers to use less expensive processes to manufacture a valve guide. By compensating for increased diametrical tolerances of the valve guide, the valve stem seal assembly 20 of the present invention reduces overall costs for an assembly and reduces the scrap rate.

Resilient seal member 22 further includes a downwardly extending seal lip 68 for contacting top surface 66 of valve guide 60 in an installed state. As shown in FIG. 2, ramp portion 50 assists in centering valve stem seal assembly 20 relative to valve guide 60 during insertion. Land portion 52 provides a greater surface area of contact for improved stability of shell 24 as it is supported on valve guide 60. Further, tang 54 is able to be positioned such that tang 54 can suitably engage and strongly resist unwanted removal of valve stem seal assembly 20 from valve guide 60. Thus, tang 54 of the present invention is positioned relative to land portion 52 for cooperating to receive a greater variety of valve guide diameters yet maintain a very strong gripping force that positively retains the valve stem seal assembly 20 on the valve guide 60 without substantially increasing required installation force. Valve stem 62 sealingly engages first and second lips 70, 72 on seal member 22 as valve stem 62 reciprocates relative to seal member 22.

A cutout 74, shown in FIG. 1, is also provided in skirt 46 for permitting insertion of a tool to assist in removal of valve stem seal assembly 20 during engine service.

Figure 3:
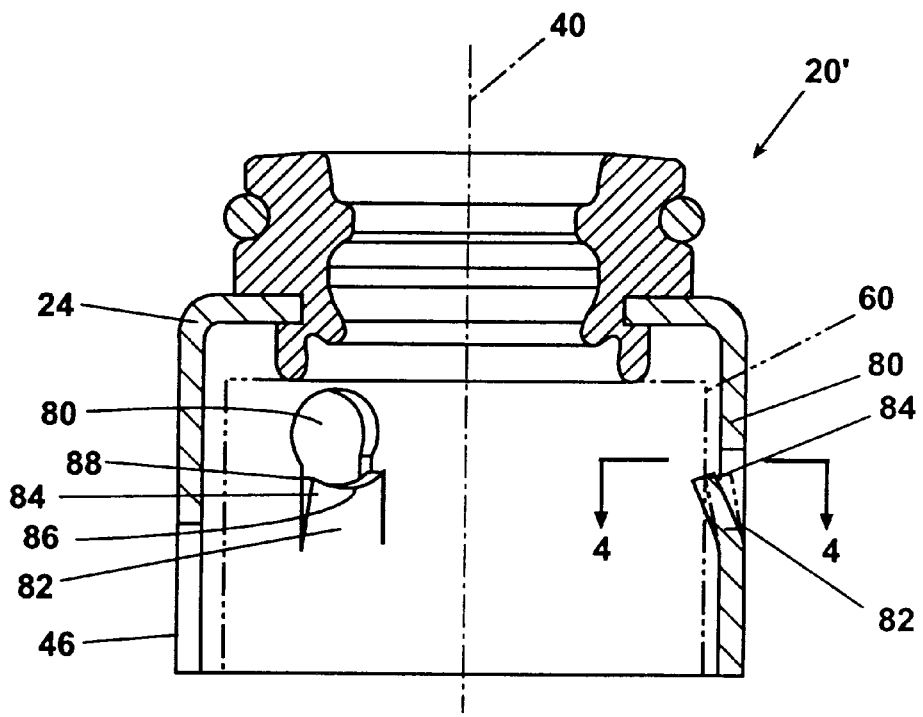
FIG. 3 is a cross-sectional side view of a valve stem seal assembly in accordance with a second embodiment of the present invention.

FIG. 3 shows a valve stem seal assembly 20' having many of the same elements as valve stem seal assembly 20. Accordingly, these similar elements have been labeled the same as elements found in the first embodiment. In the second embodiment, an aperture 80 is formed in skirt 46 to facilitate formation of a tang 82. Aperture 80 is preferably generally circular in shape and is located above tang 82 such that an arcuate portion of aperture 80 forms an end portion 84 of tang 82. Aperture 80 is preferably provided by a punching operation that utilizes a press.

Figure 4:
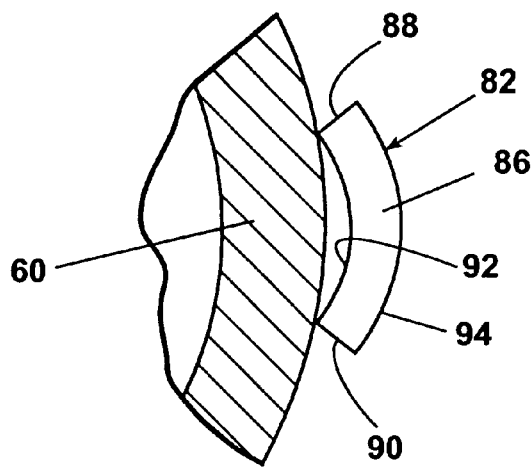
FIG. 4 is a partial sectional view taken along lines 4—4 of FIG. 3.

Similar to the first embodiment, valve stem seal assembly 20' preferably includes three circumferentially spaced apart tangs 82. End portion 84 of tang 82 projects inwardly toward central axis 40 of shell 24. Tang 82 is a generally inclined ramp that is integral with skirt 46. As illustrated in FIG. 3, end portion 84 includes a central arcuate region 86 that has a same radius as aperture 80. Arcuate region 86 is generally concave and is generally perpendicular to the radius of curvature of the inner surface 42 of skirt 46. Arcuate region 86 connects first and second spaced apart shoulders 88, 90 that project generally upwardly at the corners of end portion 84. Referring to FIG. 4, tang 82 is generally arcuate about central axis 40 and has arcuate inner and outer surfaces 92, 94. Therefore, spaced apart first and second shoulders 88, 90 are able to provide two concentrated points for more focused gripping of an outside diameter of a valve guide 60. Thus, tang 82 according to the present invention provides increased gripping of a valve guide that improves the resistance of the valve stem seal assembly against unwanted removal.

In addition, seal member 22 is preferably bonded to shell 24 in both of the disclosed embodiments to provide increased seal life by preventing relative movement between seal member 22 and shell 24.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A valve stem seal assembly comprising:
   a resilient seal member having an outer periphery and an inner sealing surface;
   a generally cylindrical shell body having a longitudinal central axis and an end wall connected to a downwardly extending skirt;
   a first aperture provided in said end wall for accommodating said resilient seal member; and
   at least one alignment pad provided in said skirt of said shell body, wherein said alignment pad includes a ramp portion which projects inwardly toward said central axis and is connected to a generally longitudinally upwardly extending land portion, said pad further including an inwardly projecting tang adjacent said land portion, wherein said alignment pad is integral with said skirt and cantilevered with respect thereto, whereby said pad is adapted to flex resiliently relative to said skirt.

2. The valve stem assembly of claim 1, wherein said resilient seal member includes a first outer groove for accommodating said end wall of said shell body.

3. The valve stem assembly of claim 1, wherein said resilient seal member includes a second outer groove for receiving a garter spring.

4. The valve stem assembly of claim 1, wherein said skirt is perforated at a predetermined location to form said at least one alignment tab.

5. The valve stem assembly of claim 1, wherein said alignment tab terminates with said inwardly projecting tang for helping prevent unwanted removal of said valve stem seal assembly from a valve guide.

6. The valve stem assembly of claim 5, wherein said plurality of alignment tabs are three alignment tabs circumferentially spaced apart around said skirt.

7. The valve stem assembly of claim 1, wherein said at least one alignment tab is a plurality of alignment tabs.

8. A valve stem seal assembly comprising:

a resilient seal member having an outer periphery and an inner sealing surface;

a first circumferential groove provided in said outer periphery of said seal member;

a generally cylindrical shell body having a longitudinal central axis and an end wall connected to a downwardly extending skirt;

a first aperture provided in said end wall for accommodating said first circumferential groove in said resilient seal member; and a plurality of alignment pads provided in said skirt of said shell body, wherein each of said alignment pads includes a ramp portion which projects inwardly toward said central axis and is connected to a land portion that extends upwardly and generally parallel to said central axis, each of said pads further including an inwardly projecting tang adjacent said land portion for improved positive retention of said valve stem seal assembly on a valve guide without substantially increasing required installation force, wherein said alignment pads are integral with said skirt and cantilevered with respect thereto, whereby said pads are adapted to flex resiliently relative to said skirt.

* * * * *

UNITED STATES PATENT AND TRADEMARK OFFICE
CERTIFICATE OF CORRECTION

PATENT NO. : 6,230,679 B1  Page 1 of 1
DATED : May 15, 2001
INVENTOR(S) : Timothy A. Hegemier et al.

It is certified that error appears in the above-identified patent and that said Letters Patent is hereby corrected as shown below:

Title page,
Item [12] Kind of Document, replace "Hegernier et al." with -- Hegemier et al. --.
Item [75] Inventors, replace "Timothy A. Hegernier" with -- Timothy A. Hegemier --.

Signed and Sealed this

Ninth Day of April, 2002

Attest:

JAMES E. ROGAN
Attesting Officer    Director of the United States Patent and Trademark Office